(12) United States Patent
Cammarota et al.

(10) Patent No.: US 11,769,036 B2
(45) Date of Patent: Sep. 26, 2023

(54) OPTIMIZING PERFORMANCE OF RECURRENT NEURAL NETWORKS

(71) Applicant: QUALCOMM Incorporated, San Diego, CA (US)

(72) Inventors: Rosario Cammarota, San Diego, CA (US); Michael Goldfarb, San Diego, CA (US); Manu Rastogi, San Diego, CA (US); Sarang Ozarde, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 833 days.

(21) Appl. No.: 15/956,674

(22) Filed: Apr. 18, 2018

(65) Prior Publication Data

US 2019/0325289 A1 Oct. 24, 2019

(51) Int. Cl.
*G06N 3/04* (2023.01)
*G06N 5/04* (2023.01)

(52) U.S. Cl.
CPC ........... *G06N 3/04* (2013.01); *G06N 5/04* (2013.01)

(58) Field of Classification Search
CPC .. G06N 3/08; G06N 3/04; G06N 3/02; G06N 3/0481; G06N 5/04; G06N 3/049; G06N 3/063

See application file for complete search history.

(56) References Cited

U.S. PATENT DOCUMENTS

| | | | | |
|---|---|---|---|---|
| 2017/0011288 | A1* | 1/2017 | Brothers | G06F 9/3017 |
| 2017/0023622 | A1 | 1/2017 | Whittaker | |
| 2017/0076196 | A1 | 3/2017 | Sainath et al. | |
| 2017/0103304 | A1* | 4/2017 | Henry | G06N 3/04 |
| 2017/0103321 | A1 | 4/2017 | Henry et al. | |
| 2017/0262995 | A1 | 9/2017 | Li et al. | |
| 2017/0323196 | A1* | 11/2017 | Gibson | G06N 3/063 |
| 2018/0314940 | A1* | 11/2018 | Kundu | G06T 15/005 |
| 2019/0147323 | A1* | 5/2019 | Li | G06N 3/0472 |
| | | | | 706/15 |

(Continued)

OTHER PUBLICATIONS

Wang et al., "A parallel-fusion RNN-LSTM architecture for image caption generation," 2016, ICIP, IEEE, pp. 4448-4452 (Year: 2016).*

(Continued)

*Primary Examiner* — Miranda M Huang
*Assistant Examiner* — Yao David Huang
(74) *Attorney, Agent, or Firm* — Holland & Hart LLP

(57) ABSTRACT

An apparatus for optimizing a computational network is configure to receive an input at a first processing component. The first processing component may include at least a first programmable processing component and a second programmable processing component. The first programmable processing component is configured to compute a first nonlinear function and the second programmable processing component is configured to compute a second nonlinear function which is different than the second nonlinear function. The computational network which may be a recurrent neural network such as a long short-term memory may be operated to generate an inference based at least in part on outputs of the first programmable processing component and the second programmable processing component.

28 Claims, 9 Drawing Sheets

(56) References Cited

U.S. PATENT DOCUMENTS

2019/0266479 A1* 8/2019 Singh .................... G06N 3/063

OTHER PUBLICATIONS

Chang et al., "Recurrent Neural Networks Hardware Implementation on FPGA," Mar. 4, 2016, arXiv:1511.05552v4 [cs.NE], 7 pages (Year: 2016).*

Han et al., "ESE: Efficient Speech Recognition Engine with Sparse LSTM on FPGA," FPGA '17, Feb. 22-24, 2017, Monterey, CA, USA (Year: 2017).*

Jia Y., et al., "Long Short-Term Memory Projection Recurrent Neural Network Architectures for Piano's Continuous Note Recognition", Hindawi Journal of Robotics, vol. 2017, Article ID 2061827, 7 Pages.

* cited by examiner

OPTIMIZING PERFORMANCE OF RECURRENT NEURAL NETWORKS

BACKGROUND

Field

Certain aspects of the present disclosure generally relate to machine learning and, more particularly, to improving systems and methods of operating streaming processors to optimize performance of recurrent neural networks.

Background

An artificial neural network, which may include an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Computational networks such as recurrent neural networks may also be useful for recognizing sequences and other temporal data. However, such computational networks are computationally complex and consume significant compute resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The features, which are believed to be characteristic of the disclosure, both as to its organization and method of operation will be better understood from the following description when considered in connection with the accompanying figures. It is to be expressly understood, however, that each of the figures is provided for the purpose of illustration and description only and is not intended as a definition of the limits of the present disclosure.

Computational networks such as recurrent neural networks may be useful for recognizing sequences and other temporal data. However, such computational networks are computationally complex and consume significant compute resources.

To address the issue of computational complexity and compute resource consumption, a computational network may be configured using processing components which may be programmed to compute multiple different nonlinear functions at the same time.

In an aspect of the disclosure, a method, a computer readable medium, and apparatus for operating a computational network are provided. The apparatus includes a memory and at least one processor coupled to the memory. The processor(s) are configured to receive an input at a first processing component. The first processing component may include at least a first programmable processing component and a second programmable processing component. The processor(s) are also configured to configure the first programmable processing component to compute a first nonlinear function and the second programmable processing component to compute a second nonlinear function, the first nonlinear function being different than the second nonlinear function. Further, the processor(s) are configured to operate the computational network to generate an inference based at least in part on outputs of the first programmable processing component and the second programmable processing component.

Additional features and potential advantages of aspects of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The features will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
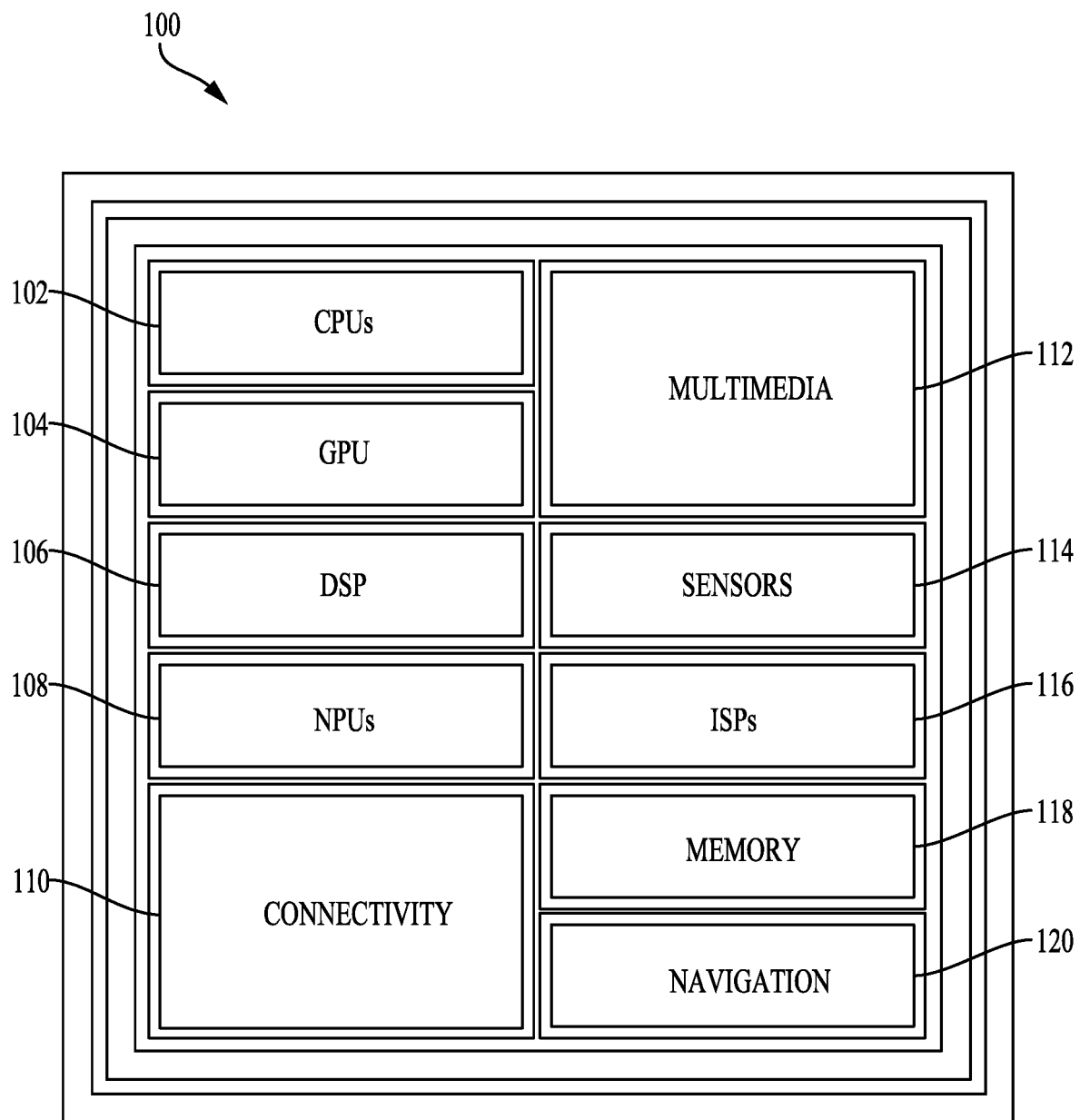
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that the various concepts may be practiced without the specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

A sigmoid function is a mathematical function having an "S" shape (sigmoid curve). For inputs greater than zero, the sigmoid curve provides an increasing output as the input increases up to a soft threshold before becoming asymptotic to a constant value for arriving at the constant value. One special case of a sigmoid function is the logistic function defined by the formula $1/(1+e^{-t})$. The logistic function is sometimes referred to as "the sigmoid function" but herein the term "sigmoid function" is used more generally to refer to the class of "S"-shaped curves. Other examples of sigmoid functions include the error function, the arctangent, and the hyperbolic tangent. Other sigmoid functions may not have a definition over the entire domain but instead may be defined piecewise, having a sigmoid curve over a range of interest.

Although particular aspects are described herein, many variations and permutations of the various aspects fall within the scope of the disclosure. Although some benefits and advantages are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the aspects of the disclosure. The detailed description and drawings are merely illustrative of the disclosure rather than limiting, the scope of the disclosure being defined by the appended claims and equivalents thereof.

Aspects of the present disclosure are directed to a programmable processing component which may be configured to compute multiple different nonlinear functions (e.g., activation functions) to optimize processing and reduce memory bandwidth in a computational network.

FIG. 1 illustrates an example implementation of the operation of a computational network (e.g., a recurrent neural network) using a system-on-a-chip (SOC) 100, which may include a general-purpose processor (CPU) or multicore general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a Neural Processing Unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation 120, which may include a global positioning system.

The SOC 100 may be based on an ARM instruction set. In an aspect of the present disclosure, the instructions loaded into the general-purpose processor 102 may include code for receiving an input at a first processing component, the first processing component comprising at least a first programmable processing component and a second programmable processing component. The instructions loaded into the general-purpose processor 102 may also include code for configuring the first programmable processing component to compute a first nonlinear function and the second programmable processing component to compute a second nonlinear function, the first nonlinear function being different than the second nonlinear function. Additionally, the instructions loaded into the general-purpose processor 102 may include code for operating the computational network to generate an inference based at least in part on outputs of the first programmable processing component and the second programmable processing component.

Figure 2:
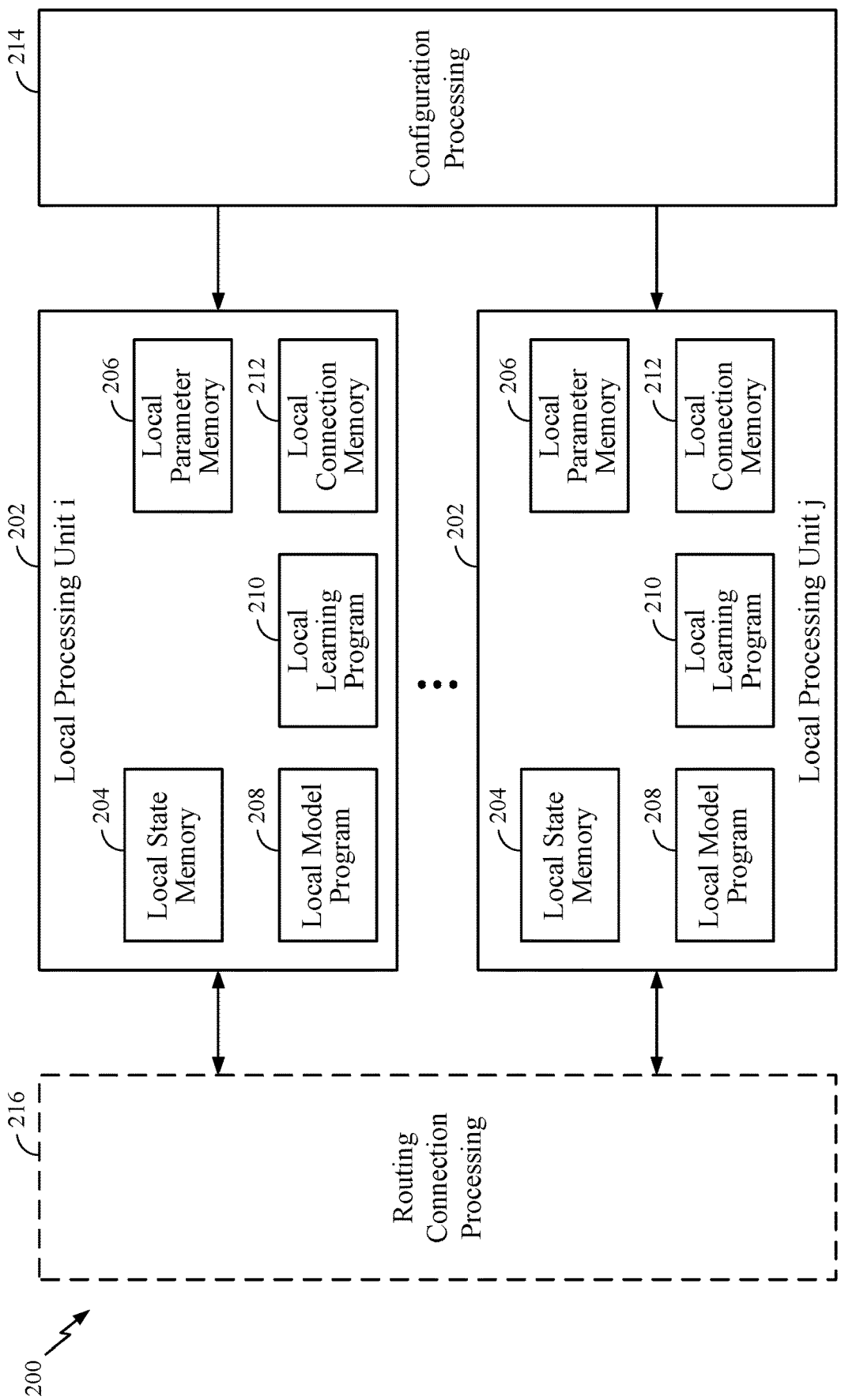
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may include a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning may address a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. Such features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3:
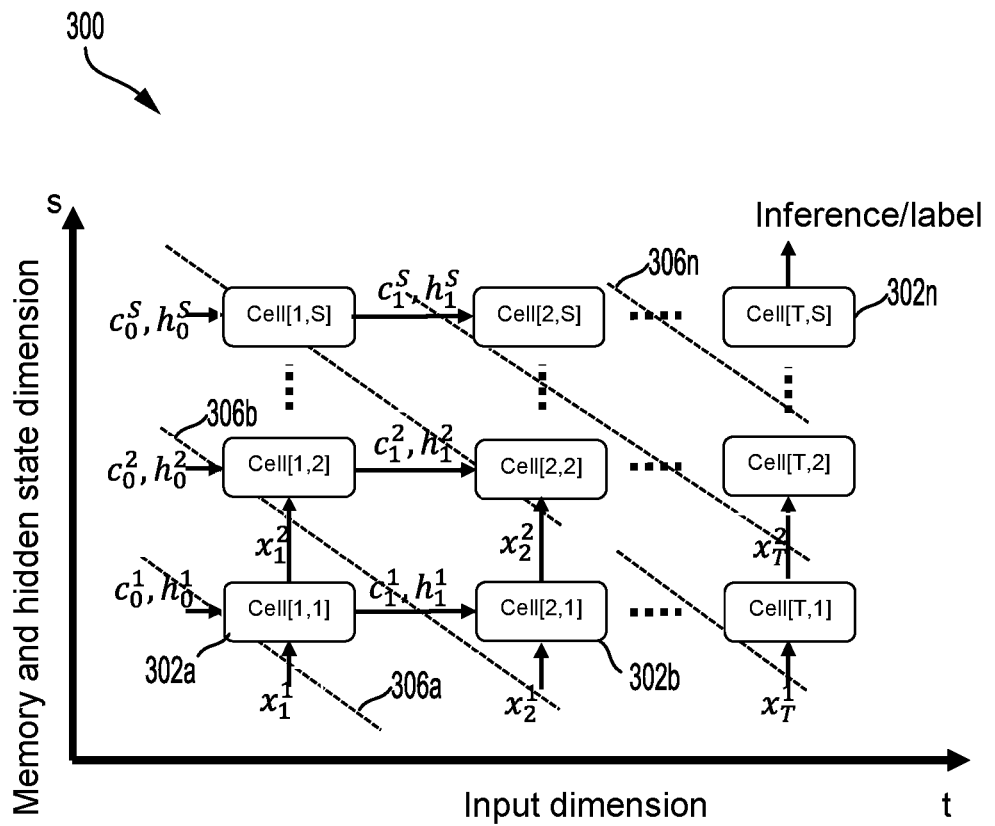
FIG. 3 is a block diagram illustrating exemplary architecture of a recurrent neural network in accordance with aspects of the present disclosure.

FIG. 3 is a block diagram illustrating an exemplary architecture of a recurrent neural network in accordance with aspects of the present disclosure. Referring to FIG. 3, the recurrent neural network (RNN) 300 may include a plurality of interconnected cells or nodes (302a-302n). A RNN is a class of architectures in which interconnected cells form a directed cycle. In some aspects the RNN may be configured as a long short-term memory, for example.

The cells (302a-302n) may be arranged in an array with each row comprising a layer in the RNN. Each of the cells (302a-302n) may receive an input 4. The input may for instance include an image or an audio signal (sample). In addition, each of the cells may also receive a memory state and a hidden state from a preceding cell of the same layer. In turn, each of the cells may be operated to generate an input to a next cell in a next layer (e.g., $x_T^{S+1}$) as well as a memory state and hidden state for a subsequent cell of the same layer. The input, memory state and hidden state may, for example, be generated according to the following equations:

$$x_t^{s+1} = \text{sigmoid}\left(\begin{bmatrix} W_{xi} \\ W_{xi} \end{bmatrix} \cdot [x_t^s \; h_{t-1}^s] + b_o\right) \quad (1)$$

$$c_t^s = f_t^s * c_{t-1}^s + i_t^s * \tilde{c}_t^s \quad (2)$$

$$h_t^s = x_t^{s+1} * \tanh(c_t^s) \quad (3)$$

where $$f_t^s = \text{sigmoid}\left(\begin{bmatrix} W_{xf} \\ W_{xf} \end{bmatrix} \cdot [x_t^s \; h_{t-1}^s] + b_f\right) \quad (4)$$

$$i_t^s = \text{sigmoid}\left(\begin{bmatrix} W_{xi} \\ W_{xi} \end{bmatrix} \cdot [x_t^s \; h_{t-1}^s] + b_i\right) \quad (5)$$

$$\tilde{c}_t^s = \tanh\left(\begin{bmatrix} W_{xc} \\ W_{xc} \end{bmatrix} \cdot [x_t^s \; h_{t-1}^s] + b_c\right) \quad (6)$$

and where $$W = \left[\begin{bmatrix} W_{xf} \\ W_{xf} \end{bmatrix} \begin{bmatrix} W_{xi} \\ W_{xi} \end{bmatrix} \begin{bmatrix} W_{xc} \\ W_{xc} \end{bmatrix} \begin{bmatrix} W_{xi} \\ W_{xi} \end{bmatrix}\right]$$

are weights of the RNN, $b=[b_f \; b_i \; b_c \; b_o]$ are bias terms.

$$\begin{bmatrix} W_{xf} \\ W_{xf} \end{bmatrix}$$

$\in \mathbb{R}^{(D+H) \times H}$, $b_f \in \mathbb{R}^H$ may comprise forget parameters of an LSTM.

$$\begin{bmatrix} W_{xi} \\ W_{xi} \end{bmatrix}$$

$\in \mathbb{R}^{(D+H) \times H}$, $b_i \in \mathbb{R}^H$ may comprise input gate parameters, $$\begin{bmatrix} W_{xc} \\ W_{xc} \end{bmatrix}$$

$\in \mathbb{R}^{(D+H) \times H}$, $b_c \in \mathbb{R}^H$ may comprise cell parameters, $$\begin{bmatrix} W_{xo} \\ W_{xo} \end{bmatrix}$$

$\in \mathbb{R}^{(D+H) \times H}$, $b_o \in \mathbb{R}^H$ are output gate parameters, and $c_0^1 \in \mathbb{R}^H$ is the initial memory state and $h_0^1 \in \mathbb{R}^H$ is the initial hidden state.

Given an input vector of size $L_x$ and a hidden layer of the RNN of size $L_h$, the total number of arithmetic operations (matrix and pointwise) may be approximated as (Lx+Lh)*Lh*4*2+Lh*(8+4+4), in addition to computation of the activation functions (e.g., sigmoid ( ) or tan h ( ). An activation function is a function that governs the behavior of a node (e.g., a cell, which may also be referred to as a node or neuron). The activation function may transform a combination of inputs, weights and biases to produce an input for a node of a subsequent layer of the network. An activation function may be implemented via a lookup table, using function approximation methods (e.g., a Taylor series or a piecewise linear function) or using an approximation of an exponential function.

A nonlinearity such as in many activation functions may be represented as an exponential function. For example, a relationship between the sigmoid function and tan h function may be expressed as:

$$\text{Tanh}(x) = 1 - \frac{2}{e^{2x}+1} = 1 - 2 sigmoid(-2x). \quad (7)$$

The computational cost of activation function may be high, depending on the cell complexity, the specific implementation of the activation function and how many activation functions can be accessed at the same time. Additionally, the amount of data transferred between an external memory and a processor is $(L_x+L_h)*L_h*4+L_h*4$.

Given an input sequence $X=(x_1, x_2, \ldots, x_T)$, a hidden layer sequence $H=h_1, h_2, \ldots, h_T$, a set of biases, and an output sequence $Y=y_1, y_2, \ldots, y_T$, the execution of an RNN network iterates the execution of one or more cells at each time step $t=1, 2, \ldots, T$.

In some aspects, a wave-front type of parallelism via systolic execution may be exploited. For instance, along each wave front 306a-n, accelerating the single cell execution may have a multiplicative effect on the total inference time.

Figure 4:
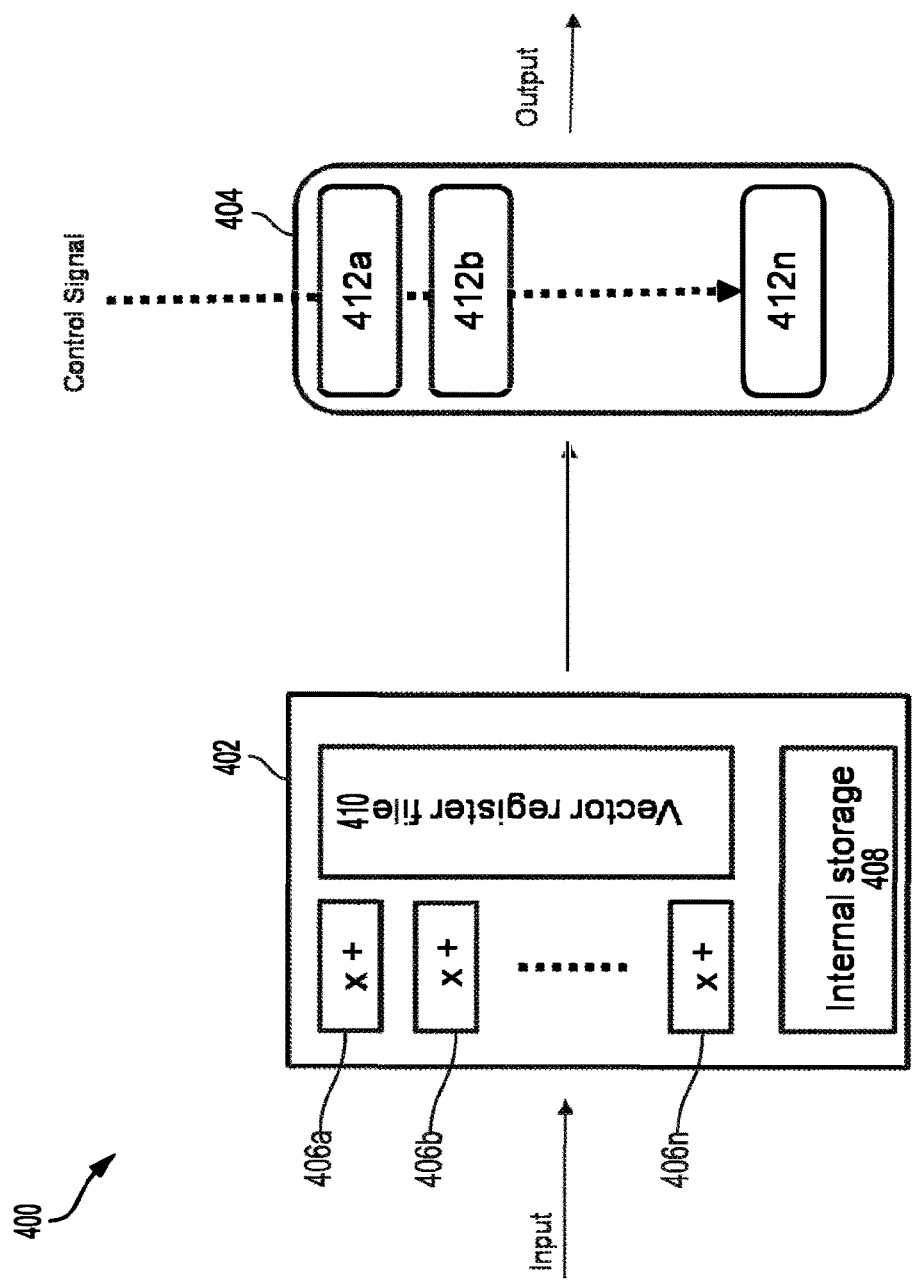
FIG. 4 is a block diagram illustrating a deep learning accelerator 400 in accordance with aspects of the present disclosure.

FIG. 4 is a block diagram illustrating a deep learning accelerator 400. The deep learning accelerator 400 may be used to accelerate the processing of data in a computational network such as RNN 300 to reduce the time for computing an inference. The deep learning accelerator 400 may include a vector computation component 402 and a non-linear processing component 404. The vector computation component 402 may include multiply/add components 406a-n to perform a multiply and accumulate operation, an internal storage component 408 and a vector register component 410. The vector computation component 402 may receive an input. The input may comprise an input vector or chunks of input data of size N, for example. The vector register component 410 may be used to retrieve a vector (e.g., a weight vector) from the internal storage component 408. The vector register component 410 may temporarily store operands used by the vector computation component 402, as well as an output of the operation performed by the vector computation component. In some aspects, the vector register component 410 may also receive information for indicating a non-linear function (e.g., an activation function) that is to be applied to the input or portion thereof (e.g., chunk n). Additionally, in some aspects, the vector computation component 402 may generate a control signal to control the nonlinear processing component 404 to apply the corresponding non-linear function to the input or portion thereof. The multiply add components 406a-n may perform a multiply and accumulate operation using the input and the retrieved vector from the internal storage component 408 to produce an output. In this way, the vector computation component 402 may compute a linear function and supply the output to the non-linear processing component 404 along with the indication of the nonlinear function to be applied to the output.

The non-linear processing component 404 may include a plurality of programmable processing components 412a-n. Each of the programmable processing components (e.g., 412a-n) may be programmed to process a non-linear function in accordance with a control signal, which may be supplied via the input. In some aspects, the control signal may be indicated based on the received output from the vector computation component 402. Based on the control signal, the programmable processing components (e.g., 412a-n) may be programmed to implement one or more different types of non-linear functions (e.g., an activation function). In one example, the programmable processing components may be programmed to implement the same non-linear function (e.g., sigmoid function). In another example, the programmable processing components may be programmed to implement a mix of different non-linear functions (e.g., 5 programmable processing components may be programmed to implement the tan h function, 3 programmable processing components may be programmed to implement the sigmoid function and 8 programmable processing components may be programmed to implement another approximated function (e.g., a function derived by the exponential function)).

Figure 5A:
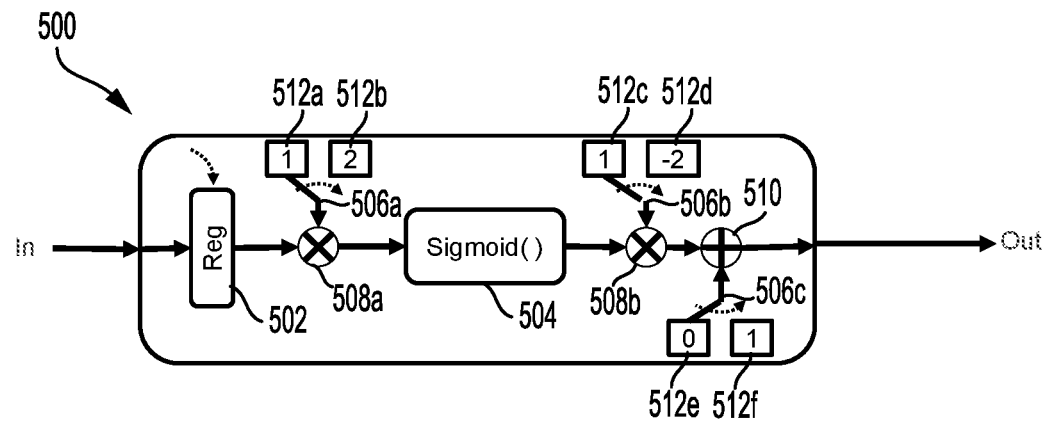
FIG. 5A is a block diagram of an exemplary programmable processing component in accordance with aspects of the present disclosure.

FIG. 5A is a block diagram of an exemplary programmable processing component in accordance with aspects of the present disclosure. Referring to FIG. 5A, the programmable processing component 500 includes a control register component 502 and a processing component 504. The programmable processing component 500 also includes switches 506a-c, multiply components 508a and 508b, register components 512a-f, and an addition component 510. The programmable processing component 500 receives as input, the output (or a portion thereof) of the vector computation component 402 and a programming control signal. The programmable processing component 500 may be programmed or configured to compute a designated non-linear function based on the received programming control signal. That is, the switches 506 a-c may be opened or closed to respectively apply the contents of register components 512a-f (e.g., a constant value) to multiply components (508a, 508b) and addition component 510 based on the programming control signal. As such, the designated nonlinear function may be applied to the input to generate an output for a next layer of the network.

As shown in the example of FIG. 5A, the processing component 504 may be configured to compute a sigmoid function. Of course, the configuration of the processing component 504 and the values of the register components 512a-f are merely exemplary and not limiting. Accordingly, with the switches 506a-c set in a first position (e.g., the position shown in FIG. 5A) under the control of the received control signal, the switch 506a may select a value in register component 512a (e.g., 1), switch 506b may select a value in register component 512c (e.g., 1) and switch 506c may select a value in register component 512e (e.g., 0). Applying the respective multiplication and addition via multiply components (508a, 508b) and the addition component 510, the programmable processing component 500 may be configured to apply the sigmoid function to the input. On the other hand, when the switches are controlled to be set to position 2 based on the control signal, switch 506a may select a value in register component 512b (e.g., 2), switch 506b may be select a value in register component 512d (e.g., −2) and switch 506c may select a value in register component 512f (e.g., 1). As such, the programmable processing component may be configured to apply the function 1−2sigmoid (−2x) =tan h(x) to the input. Accordingly, by controlling the switch settings, the programmable processing component 500 may be selectively configured to compute multiple different nonlinear functions.

Figure 5B:
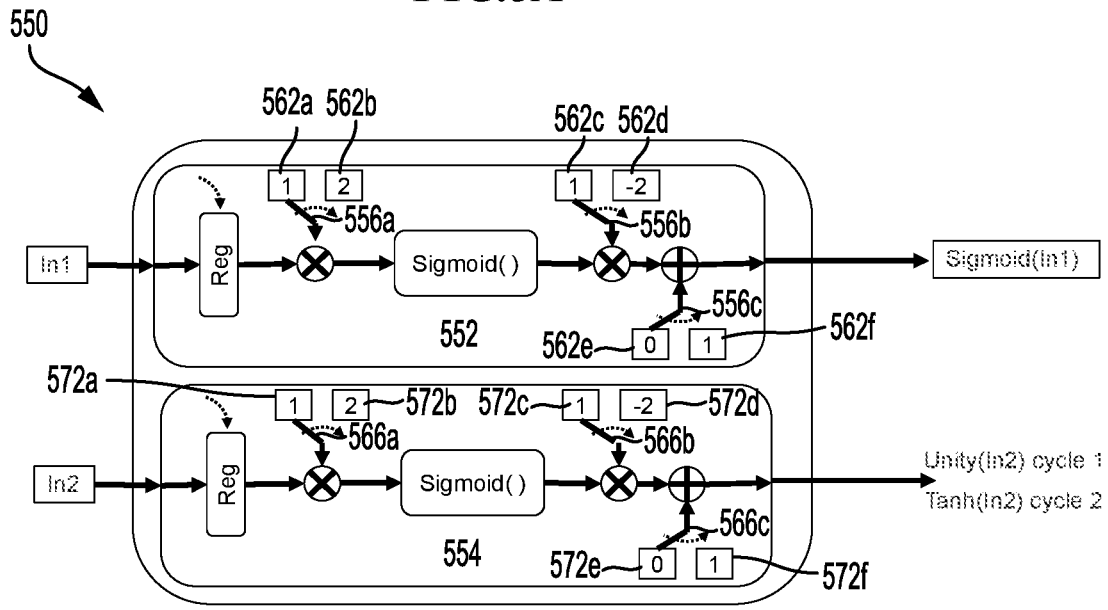
FIG. 5B is a block diagram of an exemplary processing component with multiple programmable processing components in accordance with aspects of the present disclosure.
Figure 5C:
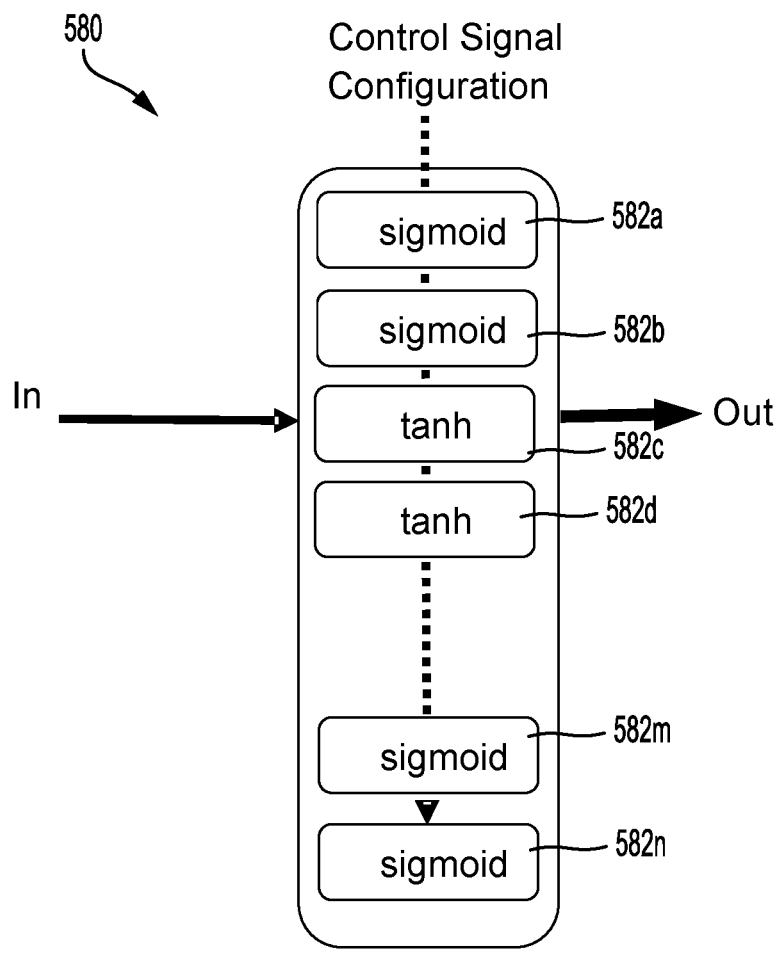
FIG. 5C is an exemplary processing component configured with multiple programmable processing components.

FIG. 5B is a block diagram of an exemplary processing component with multiple programmable processing components in accordance with aspects of the present disclosure. As shown in the FIG. 5B, a processing component 550 includes two programmable processing components 552 and 554. In the example of FIG. 5B, each of the programmable processing components 552 and 554 are configured similar to programmable processing component 500 and switches 556a-c and 566a-c may be operated in a manner similar to switches 506a-c described above with respect to FIG. 5A. That is, based on a received control signal, switches 556a-c and 566a-c may be respectively set to select values of register components 562a-f and 572a-f. Accordingly, programmable processing components 552 and 554 may be configured to compute a nonlinear function. As shown in FIG. 5B, the programmable processing component 552 may be configured to apply the sigmoid function to the input In1. On the other hand, programmable processing component 554 may be configured to apply a unity function to input In2 in a first cycle (e.g., switches 566a-c in position 1) and tan h in a second cycle (e.g., switches 566a-c in position 1). Accordingly, in some aspects, processing component 550 may be configured to compute multiple nonlinear functions simultaneously (e.g., in the same time period). The nonlinear functions may be the same or may be different. For example, as shown in FIG. 5C a processing component 580 is configured with programmable processing components 582a-n. By way of example only, programmable processing components 582a, 582b, 582m and 582n are configured to compute the sigmoid function of a respective portion of the input (e.g., a chunk) based on a received control signal while programmable processing components 582c and 582d are configured to compute the tan h function of a respective portion of the input based on a received control signal.

Accordingly, by configuring programmable processing components to compute or apply different nonlinear functions simultaneously or with the same time period, processing efficiency may be increased and memory bandwidth consumption of the computational network may be decreased. For example, when implemented in an RNN such as a long short-term memory, equations 4-6 above may be computed simultaneously, thereby reducing the number of memory accesses. Additionally, matrix concatenation may be increased.

Figure 6:
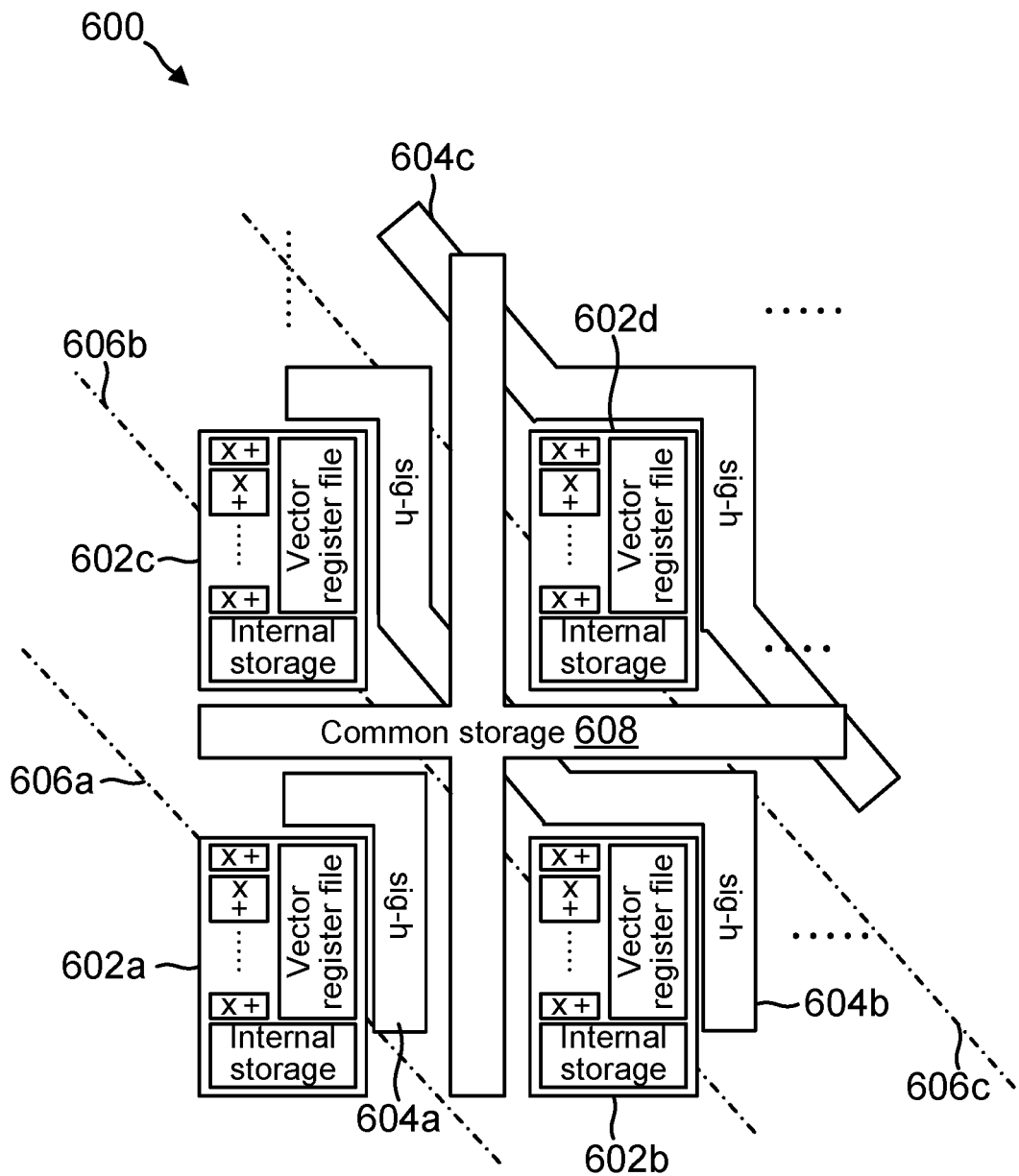
FIG. 6 is a block diagram illustrating a deep learning model using a multi-processor in accordance with aspects of the present disclosure.

FIG. 6 is a block diagram illustrating a deep learning model using a multi-processor in accordance with aspects of the present disclosure. The deep learning model 600 may comprise an RNN (e.g., RNN 300) which may be configured as a long short-term memory (LSTM), for instance. As discussed above, an RNN may include a plurality of interconnected cells. The computation of each of cell of the model may be performed via a vector computation component (e.g., 602a-d) and a programmable processing component (e.g., shown as sig-h 604a-c). The operation of the vector computation components and the programmable processing components are similar to that of like elements described above in FIGS. 4 and 5A-C. As shown in FIG. 6, the programmable processing components 604a-c are configured for execution along the wavefronts 606a-c so as to reduce and possibly optimize cell execution time in a multi-processor computational system using a common storage 608.

Figure 7:
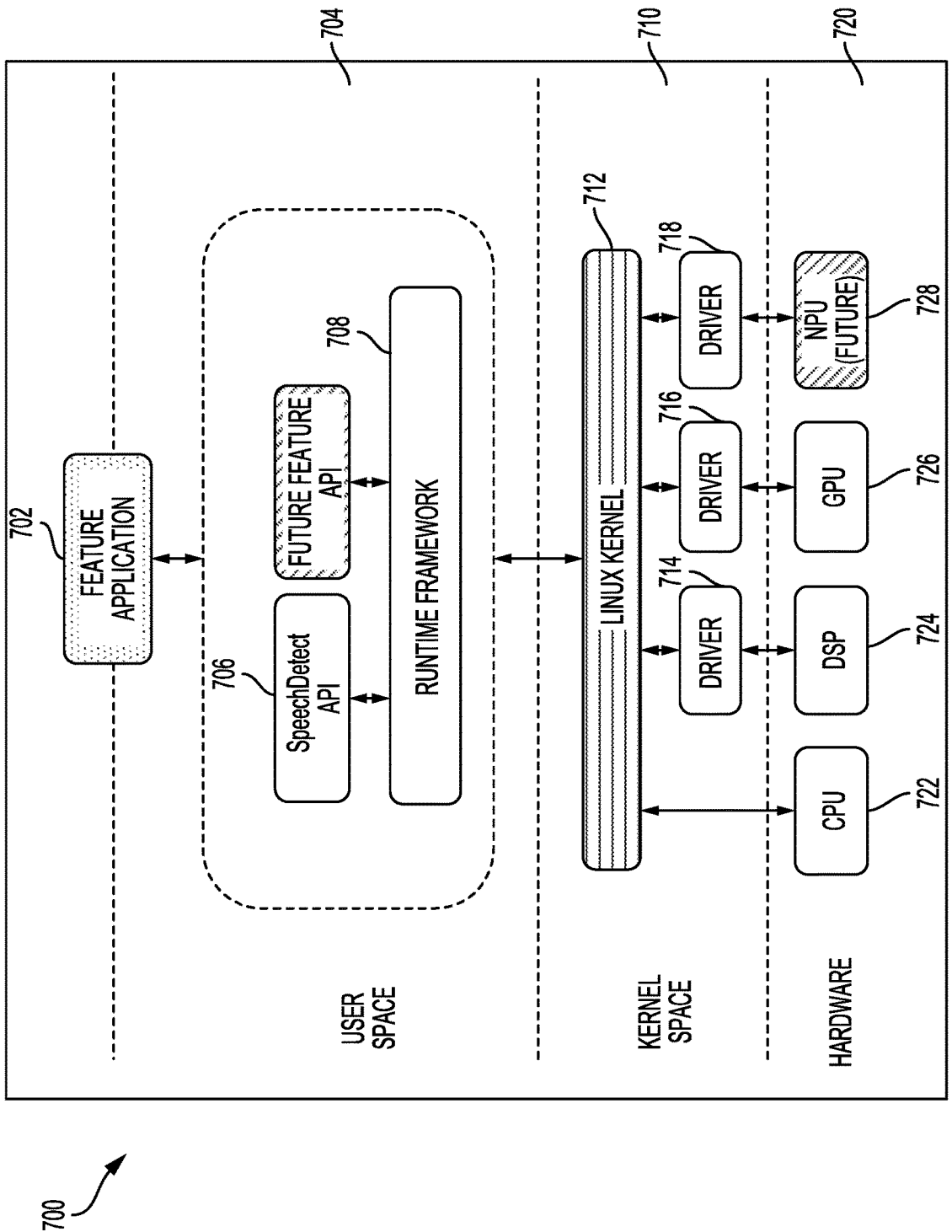
FIG. 7 is a block diagram illustrating an exemplary software architecture that may modularize artificial intelligence (AI) functions in accordance with aspects of the present disclosure.

FIG. 7 is a block diagram illustrating an exemplary software architecture 700 that may modularize artificial intelligence (AI) functions. Using the architecture, application 702 may be designed to cause various processing blocks of an SOC 720 (for example a CPU 722, a DSP 724, a GPU 726 and/or an NPU 728) to perform supporting computations during run-time operation of the application 702.

The AI application 702 may be configured to call functions defined in a user space 704 that may, for example, provide for the detection and recognition of a scene indicative of sequence data such as audio data of sounds observed or characters in an image observed via the device. The AI application 702 may, for example, configure a microphone and a camera differently depending on whether the speech to be recognized is an office, a lecture hall, a restaurant, or an outdoor setting with wind noise. The AI application 702 may make a request to compiled program code associated with a library defined in a SpeechDetect application programming interface (API) 706 to provide an estimate of the current speech. This request may ultimately rely on the output of a deep neural network configured to provide inferences of the speech content based on audio and temporal sequence data, for example.

A run-time engine 708, which may be compiled code of a Runtime Framework, may be further accessible to the AI application 702. The AI application 702 may cause the run-time engine, for example, to request a speech estimate at a particular time interval or be triggered by an event detected by the user interface of the application. When caused to estimate the speech, the run-time engine may in turn send a signal to an operating system 710, such as a Linux Kernel 712, running on the SOC 720. The operating system 710, in turn, may cause a computation to be performed on the CPU 722, the DSP 724, the GPU 726, the NPU 728, or some combination thereof. The CPU 722 may be accessed directly by the operating system, and other processing blocks may be accessed through a driver, such as a driver 714-718 for a DSP 724, for a GPU 726, or for an NPU 728. In the exemplary example, the deep neural network such as RNN 300 may be configured to run on a combination of processing blocks, such as a CPU 722 and a GPU 726, or may be run on an NPU 728, if present.

Figure 8:
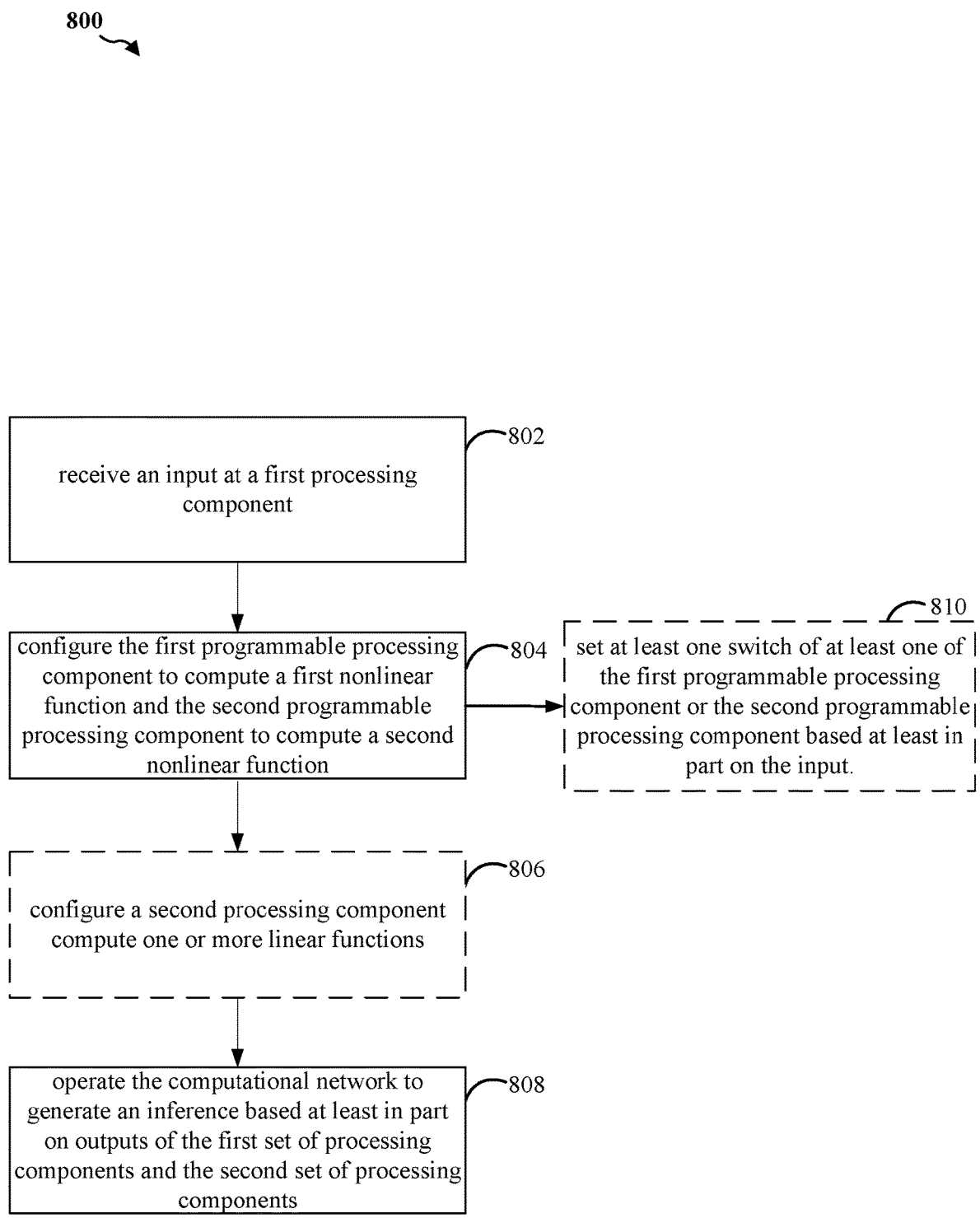
FIG. 8 illustrates a method for operating a computational network in accordance with aspects of the present disclosure.

FIG. 8 illustrates a method 800 for operating a computational network. The method may be executed by a processor (e.g., CPU 102 and local processing unit 202), for example. In block 802, an input is received at a first processing component. The first processing component may include at least a first programmable processing component and a second programmable processing component. The input may include image data, audio data or other data, for example.

In block 804, the first programmable processing component may be configured to compute a first nonlinear function and the second programmable processing component is configured to compute a second nonlinear function. For example, as shown in FIG. 5A, a programmable processing component includes a plurality of switches (e.g., 506a-c) which may be set via a control signal to select specific register component values (e.g., value store in register component 512a-f). When the switches 506a-c are set in a first position (e.g., the position shown in FIG. 5A) under the control of the received control signal, the switch 506a selects a value in register component 512a (e.g., 1), switch 506b selects a value in register component 512c (e.g., 1) and switch 506c selects a value in register component 512e (e.g., 0). Applying the respective multiplication and addition via multiply components (508a, 508b) and the addition component 510, the programmable processing component 500 may be configured to apply the sigmoid function to the input. When the switches are controlled to be set to position 2 based on the control signal, switch 506a selects a value in register component 512b (e.g., 2), switch 506b selects a value in register component 512d (e.g., −2) and switch 506c selects a value in register component 512f (e.g., 1). As such, the programmable processing component may be configured to apply the function 1−2sigmoid (−2x)=tan h(x) to the input.

In some aspects, the first processing component may include n programmable processing components wherein at least two of the n programmable processing components are configured to compute different nonlinear functions.

Additionally, in some aspects, the first programmable processing component may be configured to compute the first nonlinear function simultaneously with or in a same time period as the second programmable processing component is configured to compute the second nonlinear function. The first nonlinear function and the second nonlinear function may be activation functions such as sigmoid, tan h, or an approximated function (e.g., a function derivable using the exponential function).

In block 810, one or more of the switches of the first programmable processing component or the second programmable processing component may optionally be set based on the input. For example, the control signal received in each programmable processing component may be specified based on the input chunk.

In block 806, a second processing component may optionally be configured to compute one or more linear functions. For example as shown in FIG. 4, the vector computation component 402 may be configured to perform a multiply add operation.

In block 808, the computational network may be operated to generate an inference based at least in part on outputs of the first programmable processing component and the second programmable processing component. For example, a computational network such as RNN 300 may receive an input such as audio data. The audio data may be partitioned into chunks and supplied to cells of a first layer of the computational network. The input chunks may be scaled according to a weights of a weight vector and supplied to nonlinear processing component which may simultaneously apply activation functions to the respective scaled input chunks to determine an activation (e.g., the hidden state, memory state and input for a next layer cell (equations 1-3)) for a next layer. The process may be similarly performed at each cell of the computational network with top layer cells providing an inference or an estimation of the likely content of the corresponding input audio data.

In one configuration, an apparatus for operating a computational network is configured for receiving an input at a first processing component. The apparatus is further configured for configuring the first programmable processing component to compute a first nonlinear function and the second programmable processing component to compute a second nonlinear function, the first nonlinear function being different than the second nonlinear function. The apparatus is additionally configured for operating the computational network to generate an inference based at least in part on outputs of the first programmable processing component and the second programmable processing component. The apparatus includes a receiving means, configuring means, and/or operating means. In one aspect, the receiving means, configuring means, and/or operating means may be the general-purpose processor 102, program memory associated with the general-purpose processor 102, memory block 118, local processing units 202, and or the routing connection processing units 216 configured to perform the functions recited. In another configuration, the aforementioned means may be any component or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

In some aspects, method 800 may be performed by the SOC 100 (FIG. 1) or the system 200 (FIG. 2). That is, each of the elements of method 800 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, the operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, components and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The operations performed by a method or algorithm described in connection with the present disclosure may be embodied directly in hardware, in a software component executed by a processor, or in a combination of the two. A software component may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software component may include a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may include a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may include packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may include one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may include a number of software modules or components. The software components include instructions that, when executed by the processor, cause the processing system to perform various functions. The software components may include a transmission component and a receiving module. Each software component may reside in a single storage device or be distributed across multiple storage devices. By way of example, a software component may be loaded into RAM from a hard drive when a triggering event occurs. During execution of the software component, the processor may load some of the instructions into cache to increase access speed. One or more cache lines may then be loaded into a general register file for execution by the processor. When referring to the functionality of a software component below, it will be understood that such functionality is implemented by the processor when executing instructions from that software component. Furthermore, it should be appreciated that aspects of the present disclosure may result in improvements to the functioning of the processor, computer, machine, or other system implementing such aspects.

If implemented in software, the functions may be stored or transmitted as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of a device operating a computational network, comprising:
  computing, at a second processing component, one or more linear functions to obtain one or more outputs, the second processing component configured to compute the one or more linear functions, wherein the second processing component is different from a first processing component configured to compute a plurality of nonlinear functions;
  generating, at the second processing component, at least one control signal based at least in part on the one or more outputs of the second processing component;
  receiving, at the first processing component and from the second processing component, an input and a plurality of control signals including the at least one control signal, the first processing component comprising at least a first programmable processing component and a second programmable processing component, wherein the input corresponds to the one or more outputs of the second processing component, and wherein the at least one control signal includes
  an indication of at least a first nonlinear function to be applied to a first portion of the input and a second nonlinear function to be applied to a second portion of the input;
  configuring, in accordance with the at least one control signal, the first programmable processing component to compute the first nonlinear function of the first portion of the input and the second programmable processing component to compute the second nonlinear function of the second portion of the input, the first nonlinear function being different than the second nonlinear function, and the first nonlinear function being computed simultaneously with the second nonlinear function; and
  operating the computational network to generate an inference based at least in part on simultaneous outputs of the first programmable processing component that computes the first nonlinear function, and the second programmable processing component that computes the second nonlinear function.

2. The method of claim 1, wherein the first nonlinear function and the second nonlinear function comprise activation functions.

3. The method of claim 2, wherein at least one of the first nonlinear function and the second nonlinear function is an approximated function.

4. The method of claim 1, wherein the configuring is based at least in part on the plurality of control signals received by the first processing component.

5. The method of claim 1, wherein the first processing component includes n programmable processing components, and further comprising configuring each of the n programmable processing components to compute a nonlinear function.

6. The method of claim 1, wherein the configuring comprises setting at least one switch of at least one of the first programmable processing component and the second programmable processing component, wherein the at least one switch is set such that at least one of the first programmable processing component computes the first nonlinear function and the second programmable processing component computes the second nonlinear function, wherein the at least one switch is set based at least in part on the input and the received plurality of control signals.

7. An apparatus for operating a computational network, comprising:
a memory; and
at least one processor coupled to the memory, the at least one processor being configured to:
compute, at a second processing component, one or more linear functions to obtain one or more outputs, the second processing component configured to compute the one or more linear functions, wherein the second processing component is different from a first processing component configured to compute a plurality of nonlinear functions;
generate, at the second processing component, at least one control signal based at least in part on the one or more outputs of the second processing component;
receive, at the first processing component and from the second processing component, an input and a plurality of control signals including the at least one control signal, the first processing component comprising at least a first programmable processing component and a second programmable processing component, wherein the input corresponds to the one or more outputs of the second processing component, and wherein the at least one control signal includes
an indication of at least a first nonlinear function to be applied to a first portion of the input and a second nonlinear function to be applied to a second portion of the input;
configure, in accordance with the at least one control signal, the first programmable processing component to compute the first nonlinear function of the first portion of the input and the second programmable processing component to compute the second nonlinear function of the second portion of the input, the first nonlinear function being different than the second nonlinear function, and the first nonlinear function being computed simultaneously with the second nonlinear function; and
operate the computational network to generate an inference based at least in part on simultaneous outputs of the first programmable processing component that computes the first nonlinear function, and the second programmable processing component that computes the second nonlinear function.

8. The apparatus of claim 7, wherein the first nonlinear function and the second nonlinear function comprise activation functions.

9. The apparatus of claim 8, wherein at least one of the first nonlinear function and the second nonlinear function is an approximated function.

10. The apparatus of claim 7, wherein the at least one processor is further configured to configure the first programmable processing component to compute the first nonlinear function and the second programmable processing component to compute the second nonlinear function based at least in part on the plurality of control signals received by the first processing component.

11. The apparatus of claim 7, wherein the first processing component includes n programmable processing components, and wherein the at least one processor is further configured to configure each of the n programmable processing components to compute a nonlinear function.

12. The apparatus of claim 7, wherein the at least one processor is further configured to set at least one switch of at least one of the first programmable processing component and the second programmable processing component, wherein the at least one switch is set such that at least one of the first programmable processing component computes the first nonlinear function and the second programmable processing component computes the second nonlinear function, wherein the at least one switch is set based at least in part on the input and the received plurality of control signals.

13. An apparatus for operating a computational network, comprising:
circuitry configured for:
computing, at a second processing component, one or more linear functions to obtain one or more outputs, the second processing component configured to compute the one or more linear functions, wherein the second processing component is different from a first processing component configured to compute a plurality of nonlinear functions;
generating, at the second processing component, at least one control signal based at least in part on the one or more outputs of the second processing component;
receiving, at the first processing component and from the second processing component, an input and a plurality of control signals including the at least one control signal, the first processing component comprising at least a first programmable processing component and a second programmable processing component, wherein the input corresponds to the one or more outputs of the second processing component, and wherein the at least one control signal includes
an indication of at least a first nonlinear function to be applied to a first portion of the input and a second nonlinear function to be applied to a second portion of the input;
configuring, in accordance with the at least one control signal, the first programmable processing component to compute the first nonlinear function of the first portion of the input and the second programmable processing component to compute the second nonlinear function of the second portion of the input, the first nonlinear function being different than the second nonlinear function, and the first nonlinear function being computed simultaneously with the second nonlinear function; and
operating the computational network to generate an inference based at least in part on outputs of the first programmable processing component that computes the first nonlinear function, and the second programmable processing component that computes the second nonlinear function.

14. The apparatus of claim 13, wherein the first nonlinear function and the second nonlinear function comprise activation functions.

15. The apparatus of claim 13, wherein at least one of the first nonlinear function and the second nonlinear function is an approximated function.

16. The apparatus of claim 13, wherein the first processing component includes n programmable processing components, and further comprising means for configuring each of the n programmable processing components to compute a nonlinear function.

17. A non-transitory computer readable medium having executable code for operating a computational network, the code being executable to perform operations comprising:

computing, at a second processing component, one or more linear functions to obtain one or more outputs, the second processing component configured to compute the one or more linear functions, wherein the second processing component is different from a first processing component configured to compute a plurality of nonlinear functions;

generating, at the second processing component, at least one control signal based at least in part on the one or more outputs of the second processing component;

receiving, at the first processing component and from the second processing component, an input and a plurality of control signals including the at least one control signal, the first processing component comprising at least a first programmable processing component and a second programmable processing component, wherein the input corresponds to the one or more outputs of the second processing component, and wherein the at least one control signal includes an indication of at least a first nonlinear function to be applied to a first portion of the input and a second nonlinear function to be applied to a second portion of the input;

configuring, in accordance with the at least one control signal, the first programmable processing component to compute the first nonlinear function of the first portion of the input and the second programmable processing component to compute the second nonlinear function of the second portion of the input, the first nonlinear function being different than the second nonlinear function, and the first nonlinear function being computed simultaneously with the second nonlinear function; and operating the computational network to generate an inference based at least in part on simultaneous outputs of the first programmable processing component that computes the first nonlinear function, and the second programmable processing component that computes the second nonlinear function.

18. The non-transitory computer readable medium of claim 17, wherein the first nonlinear function and the second nonlinear function comprise activation functions.

19. The non-transitory computer readable medium of claim 17, wherein at least one of the first nonlinear function and the second nonlinear function is an approximated function.

20. The non-transitory computer readable medium of claim 17, the operations further comprising configuring the first programmable processing component to compute the first nonlinear function and the second programmable processing component to compute the second nonlinear function based at least in part on the plurality of control signals received by the first processing component.

21. The non-transitory computer readable medium of claim 17, wherein the first processing component includes n programmable processing components, and the operations further comprising configuring each of the n programmable processing components to compute a nonlinear function.

22. The non-transitory computer readable medium of claim 17, the operations further comprising setting at least one switch of at least one of the first programmable processing component and the second programmable processing component, wherein the at least one switch is set such that at least one of the first programmable processing component computes the first nonlinear function and the second programmable processing component computes the second nonlinear function, wherein the at least one switch is set based at least in part on the input and the received plurality of control signals.

23. The apparatus of claim 13, wherein configuring the first programmable processing component to compute the first nonlinear function and the second programmable processing component to compute the second nonlinear function is based at least in part on the plurality of control signals received by the first processing component.

24. The method of claim 1, wherein the inference comprises an estimate of speech inferred from audio captured by the device or an estimate of characters inferred from one or more images captured by the device, or both.

25. The method of claim 6, wherein the first nonlinear function is computed based at least in part on the at least one switch being at a first position, and the second nonlinear function is computed based at least in part on the at least one switch being at a second position.

26. The apparatus of claim 12, wherein the first nonlinear function is computed based at least in part on the at least one switch being at a first position, and the second nonlinear function is computed based at least in part on the at least one switch being at a second position.

27. The apparatus of claim 13, wherein:
the configuring comprises setting at least one switch of at least one of the first programmable processing component and the second programmable processing component, wherein the at least one switch is set such that at least one of the first programmable processing component computes the first nonlinear function and the second programmable processing component computes the second nonlinear, wherein the at least one switch is set based at least in part on the input and the received plurality of control signals, and
the first nonlinear function is computed based at least in part on the at least one switch being at a first position, and the second nonlinear function is computed based at least in part on the at least one switch being at a second position.

28. The non-transitory computer readable medium of claim 22, wherein the first nonlinear function is computed based at least in part on the at least one switch being at a first position, and the second nonlinear function is computed based at least in part on the at least one switch being at a second position.

* * * * *